Dec. 9, 1924.
G. C. HUME
LINE HOLDER
Filed May 13, 1924
1,518,850
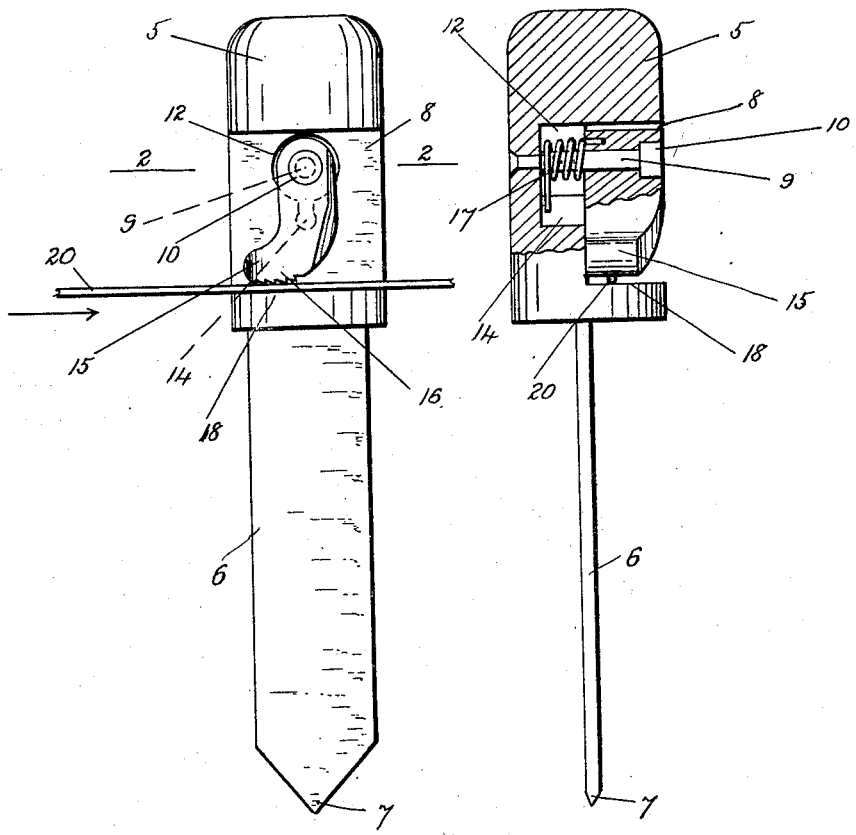
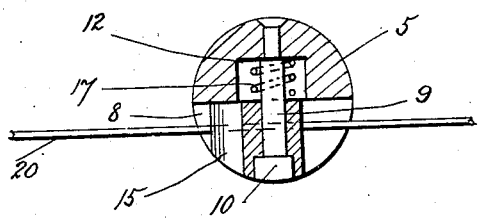

Patented Dec. 9, 1924.

1,518,850

UNITED STATES PATENT OFFICE.

GEORGE C. HUME, OF CHILTON, WISCONSIN.

LINE HOLDER.

Application filed May 13, 1924. Serial No. 712,972.

*To all whom it may concern:*

Be it known that I, GEORGE C. HUME, a citizen of the United States, residing at Chilton, in the county of Calumet and State of Wisconsin, have invented certain new and useful Improvements in Line Holders, of which the following is a specification.

This invention relates to devices for holding lines such as those used by carpenters and builders, and those used as washlines; and it consists in the novel construction and combination of the parts hereinafter fully described and claimed.

In the drawings: Figure 1 is a side view of a line holder constructed according to this invention. Fig. 2 is a cross-section through the holder, taken on the line 2—2 in Fig. 1. Fig. 3 is a side view of the line holder turned around one-quarter from the position shown in Fig. 1, and partly in section.

A supporting pillar 5 is provided, and has a shank 6 for securing it in place. When the holder is to be used by builders this shank is preferably a thin blade having a point 7 so that it can be driven into a wall between two bricks. Any other fastening device may be provided however, such as a screw or spike, according to the use to which the holder is put.

The pillar 5 is preferably cylindrical, and it has a notch 8 in one side. The bottom of the notch is flat and is arranged parallel to the axis of the cylindrical pillar. A pin 9 is secured at one end to the pillar, and projects from it radially, and is arranged within the upper part of the notch, and has a head 10 on its outer end. The pillar 5 has an annular chamber 12 formed in it around a portion of the pin, and this chamber has a recess 14 on one side. A cam 15 is mounted on the pin 9, and has a serrated portion 16. A helical spring 17 is arranged in the chamber 12 around the pin, and one end portion of it engages with the recess 14. The other end portion of the spring is secured to the cam in any approved way and the spring presses the serrated part 16 of the cam towards the lower end 18 of the notch 8.

The line 20 is inserted in the notch 18 between the cam and the part 18, and, when the line is stretched tightly in the direction of the arrow, the line is clamped to the holder by the tension of its tightly stretched portion, which draws the cam towards the part 18. The line is released by moving the cam pivotally by hand against the pressure of the spring.

The line holder is made in different sizes according to the use to which it is put, and a large size is shown, for clearness. The cylindrical form of the pillar, and the position of the cam wholly inside the notch 8 makes the device easy to carry and to handle, and protects the cam from injury and accidental displacement when in use.

What I claim is:

1. In a line holder, a supporting pillar having a notch in one side, said pillar being cylindrical and the notch having a flat bottom arranged parallel to the axis of the pillar, and a spring-pressed cam pivoted to the pillar and arranged within the notch and operating to clamp the line against one end of the notch.

2. In a line holder, a supporting pillar having a notch in one side, a spring-pressed cam pivoted to the pillar and arranged within the notch and operating to clamp the line against one end of the notch, and a thin and pointed blade which projects from one end of the pilar and affords a means for securing it in place.

3. In a line holder, a supporting pillar having a notch in one side, said pillar being cylindrical and the notch having a flat bottom arranged parallel to the axis of the pillar, a radial pin secured to the pillar and arranged in the said notch, a chamber being formed in the pillar at the bottom of the notch around a portion of the said pin, a cam pivoted on the said pin, and a helical spring arranged in the said chamber and having its end portions connected to the pillar and to the cam respectively, said cam operating to clamp the line against one end of the notch.

4. In a line holder, a cylindrical supporting pillar having a notch in one side, the bottom of the said notch being flat and arranged parallel to the axis of the pillar, and a spring-pressed cam pivoted to the pillar and arranged wholly within the said notch and operating to clamp the line against one end of the notch.

In testimony whereof I have affixed my signature.

GEORGE C. HUME.